United States Patent
Chapman et al.

(10) Patent No.: US 11,206,752 B2
(45) Date of Patent: Dec. 28, 2021

(54) MINI DIKER FARM IMPLEMENT SYSTEM AND DIKING METHOD

(71) Applicant: DESERT SUNSET AG, LLC, American Falls, ID (US)

(72) Inventors: James Thomas Chapman, American Falls, ID (US); Aaron Donald Bates, American Falls, ID (US)

(73) Assignee: Desert Sunset AG, LLC, American Falls, ID (US)

( * ) Notice: Subject to any disclaimer, the term of this patent is extended or adjusted under 35 U.S.C. 154(b) by 42 days.

(21) Appl. No.: 16/842,857

(22) Filed: Apr. 8, 2020

(65) Prior Publication Data
US 2021/0274696 A1 Sep. 9, 2021

Related U.S. Application Data

(60) Provisional application No. 62/986,649, filed on Mar. 7, 2020.

(51) Int. Cl.
*A01B 13/16* (2006.01)
(52) U.S. Cl.
CPC .................... *A01B 13/16* (2013.01)
(58) Field of Classification Search
CPC .... E02F 3/18; E02F 3/241; E02F 5/08; A01B 13/16
See application file for complete search history.

(56) References Cited

U.S. PATENT DOCUMENTS

| | | | | |
|---|---|---|---|---|
| 2,174,045 A | * | 9/1939 | Seaman | A01B 13/16 172/529 |
| 2,187,051 A | * | 1/1940 | Peacock | A01B 13/16 111/83 |
| 2,193,275 A | * | 3/1940 | Elliott | A01B 13/16 172/143 |
| 2,233,331 A | * | 2/1941 | Vratil | A01B 13/16 172/182 |
| 2,236,832 A | * | 4/1941 | Nielsen | A01B 13/16 172/530 |
| 2,249,864 A | * | 7/1941 | Silver | A01B 13/16 172/235 |

(Continued)

OTHER PUBLICATIONS

Little Diker: Conserving water, soil, crops, and time since 2014, web site: http://littlediker.com, pp. 1-6, 2020.

*Primary Examiner* — Jessica H Lutz
(74) *Attorney, Agent, or Firm* — Stephen A. Gratton

(57) ABSTRACT

A mini diker farm implement system for diking a field includes one or more mini diker assemblies attached to farming equipment configured for movement through the field by a tractor. Each mini diker assembly includes a mounting bracket assembly, an H-frame assembly pivotably attached to the mounting bracket assembly, a diker paddle wheel assembly having a paddle wheel supported for rotation by the H-frame assembly, and a lift arm assembly configured to adjust a position of the paddle wheel. A diking method includes the steps of providing the mini diker farm implement system, removably attaching the mounting bracket assembly to the farming equipment, adjusting the vertical position of the paddle wheel using the lift arm assembly, and moving the farming equipment through the field to rotate the diker paddle wheel and form dikes and reservoirs.

15 Claims, 10 Drawing Sheets

(56) References Cited

U.S. PATENT DOCUMENTS

| | | | | |
|---|---|---|---|---|
| 2,252,593 A * | 8/1941 | Bruene | ............... | A01B 13/16 |
| | | | | 172/552 |
| 4,102,406 A * | 7/1978 | Orthman | ............... | A01B 13/16 |
| | | | | 172/177 |
| 4,303,129 A | 12/1981 | Mills | | |
| 4,350,210 A | 9/1982 | Shadden et al. | | |
| 4,508,177 A * | 4/1985 | Wiser | ............... | A01B 13/16 |
| | | | | 172/177 |
| 5,732,780 A * | 3/1998 | Nikkei | ............... | A01B 39/08 |
| | | | | 172/177 |
| 7,806,197 B2 * | 10/2010 | Steinlage | ............... | A01B 33/021 |
| | | | | 172/176 |
| 8,714,276 B2 * | 5/2014 | Hake | ............... | A01B 35/28 |
| | | | | 172/176 |
| 9,267,255 B2 * | 2/2016 | Claussen | ............... | A01B 39/08 |
| 2016/0165787 A1 * | 6/2016 | Claussen | ............... | E02F 3/241 |
| | | | | 172/548 |
| 2018/0242507 A1 * | 8/2018 | Rewis | ............... | A01D 43/00 |

\* cited by examiner

MINI DIKER FARM IMPLEMENT SYSTEM AND DIKING METHOD

CROSS REFERENCE TO RELATED APPLICATION

This application claims priority from U.S. Provisional No. 62/986,649, filed Mar. 7, 2020 which is incorporated herein by reference.

FIELD

This disclosure relates to farming systems and to farming methods and particularly to diker systems for producing dikes and reservoirs at spaced intervals between crop rows in a field.

BACKGROUND

In farming, a diker system can be used to form dikes in a field. The dikes are made of soil and are formed at spaced intervals in crop rows defined by furrows. The dikes form reservoirs that retain water throughout the field so that it can be absorbed by the crops. The dikes also prevent wind and water erosion of the soil and prevent excessive drainage along the furrows.

Prior art diker systems include large and complicated machinery as well as springs and hydraulics for operating. U.S. Pat. No. 4,303,129 to Mills; U.S. Pat. No. 4,350,210 to Shadden et al.; and U.S. Pat. No. 4,508,177 to Wiser disclose exemplary diker systems.

In view of the short comings of prior art diker systems, it would be desirable to have a diking system that can be easily attached to conventional farm implements by an operator in different configurations. The present disclosure is directed to a mini diker farm implement system for diking a field configured for mounting to various farming equipment for independent operation. In addition, the present disclosure is directed to a diking method using the mini diker farm implement system.

SUMMARY

A mini diker farm implement system for diking a field includes at least one mini diker assembly attachable to farming equipment configured for movement through the field by a tractor. Exemplary farming equipment includes tool bars, cultivators, planters and grain drills. One or more mini diker assemblies can be attached to the farming equipment in a desired configuration to modify existing equipment to add a diking system. Alternately, one or more mini diker assemblies can be attached to a tool bar as a stand alone diking system. In each system, each mini diker assembly operates independently, without springs or hydraulics, using only kinetic energy supplied by movement of the tractor. In addition, each mini diker assembly can be installed by an operator using conventional tools and minimal manpower, and then adjusted without tools.

Each mini diker assembly includes a mounting bracket assembly, an H-frame assembly pivotably attached to the mounting bracket assembly, a diker paddle wheel assembly having a paddle wheel supported for rotation by the H-frame assembly, and a lift arm assembly configured to adjust a position of the paddle wheel. The mounting bracket assembly removably attaches to the farming equipment. The H-frame assembly is pivotably attached to the mounting bracket assembly and supports the diker paddle wheel assembly for rotation. The lift arm assembly is adjustably attached to the mounting bracket assembly and allows adjustment of the vertical position of the diker paddle wheel assembly. In operation, the diker paddle wheel rotates with movement of the tractor through the field, forming the dikes and the reservoirs as it rotates. In addition, paddles on the diker paddle wheel dig into a layer of soil forming the reservoirs and piling extra soil from the reservoirs to form the dikes. The depth of the reservoirs and the height of the dikes can be controlled by adjustment of the vertical position of the diker paddle wheel using the lift arm assembly. In addition, the overall height of the diker paddle wheel can also be adjusted by utilizing the multiple mounting holes on the reversible mounting bracket assembly. Relocation of the mounting bracket assembly up or down as needed moves the entire diker paddle wheel assembly accordingly.

A diking method for diking a field includes the initial step of providing a mini diker farm implement system that includes a mounting bracket assembly configured for removable attachment to farming equipment configured for movement through the field by a tractor, an H-frame assembly pivotably attached to the mounting bracket assembly, a diker paddle wheel assembly supported for rotation by the H-frame assembly, and a lift arm assembly configured to adjust a vertical position of the paddle wheel. The method also includes the steps of removably attaching the mounting bracket assembly to the farming equipment, adjusting the vertical position of the paddle wheel using the lift arm assembly, and moving the farming equipment through the field to rotate the diker paddle wheel and form dikes and reservoirs.

DETAILED DESCRIPTION

Figure 1:
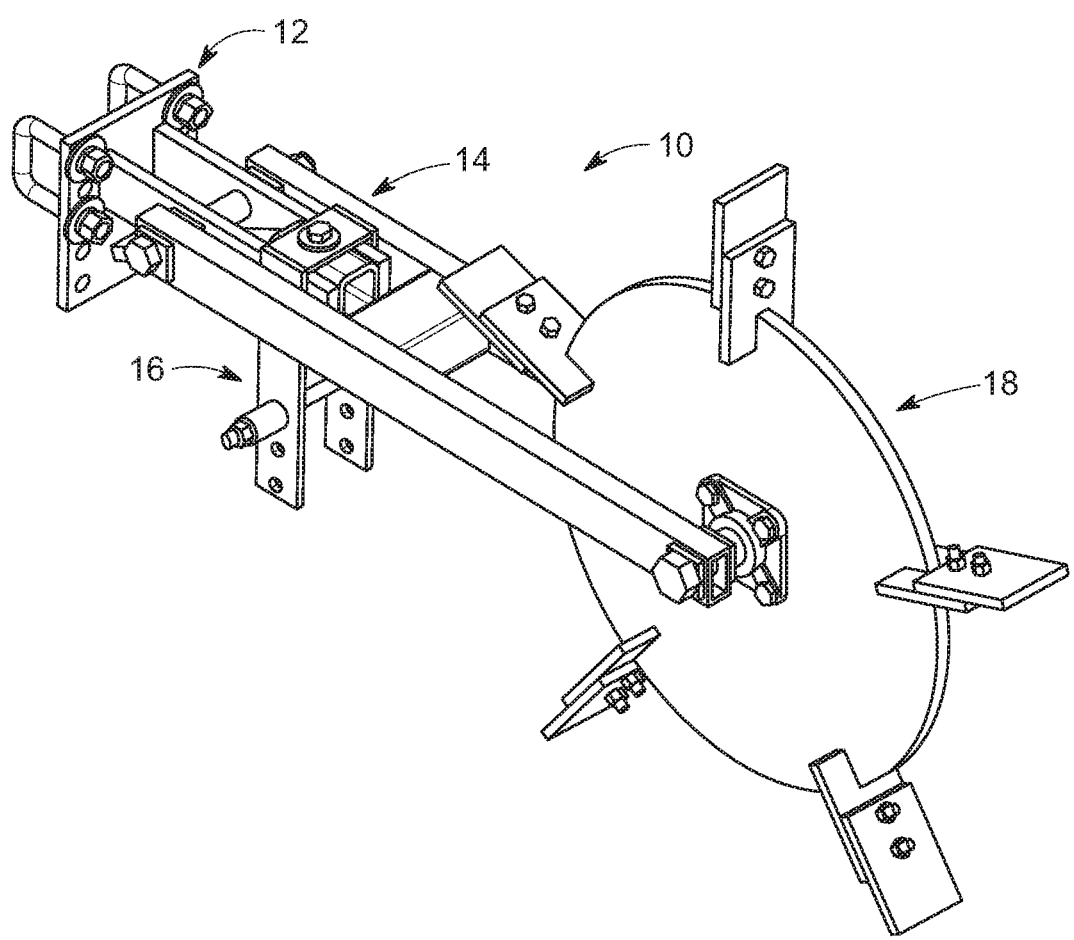
FIG. 1 is a perspective drawing of a mini diker assembly.
Figure 2:
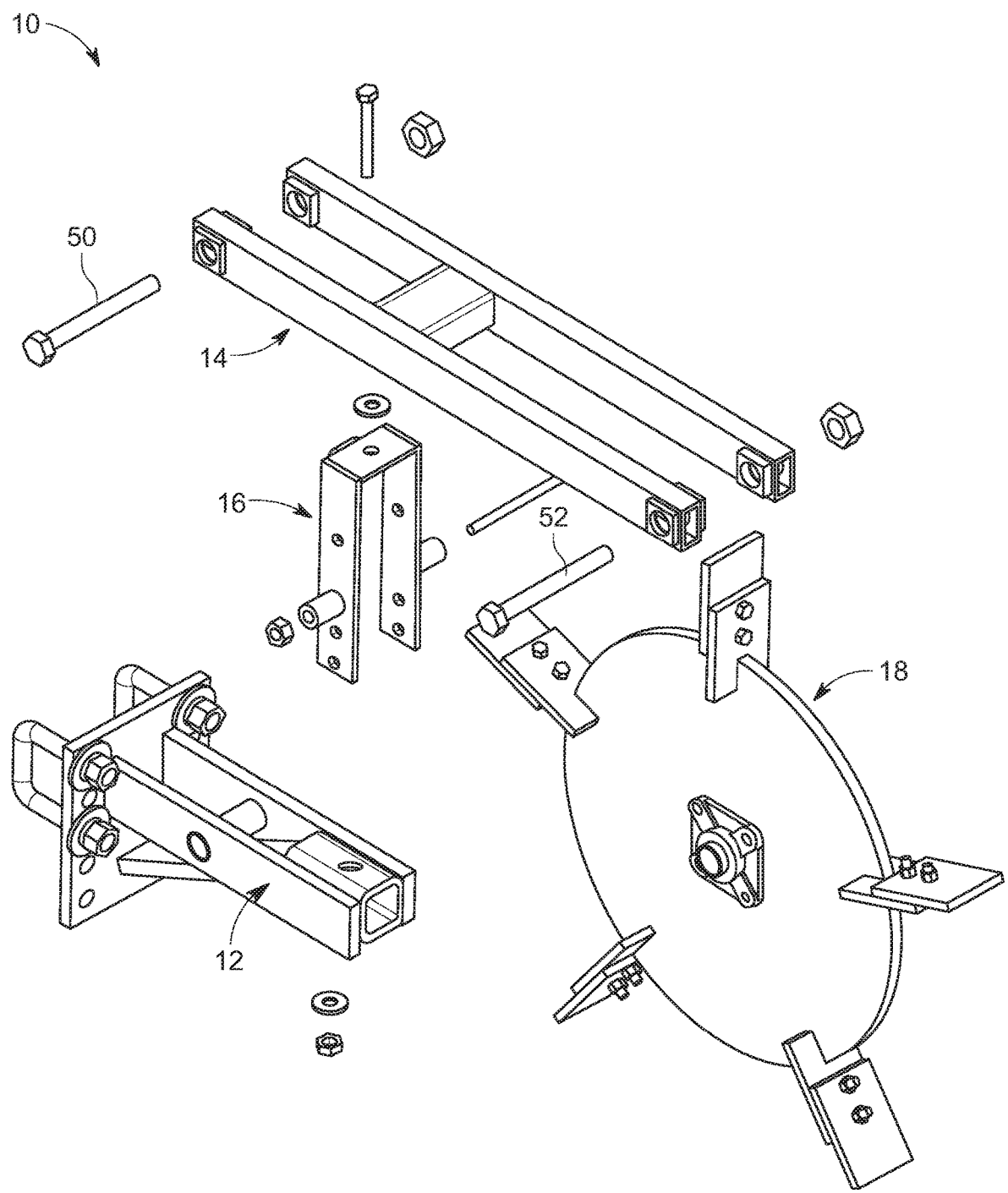
FIG. 2 is an exploded assembly drawing of the mini diker assembly.

Referring to FIGS. 1 and 2, a mini diker assembly 10 includes a mounting bracket assembly 12, an H-frame assembly 14, a lift arm assembly 16, and a diker paddle wheel assembly 18. Further details of these elements will become more apparent as the description proceeds. As used herein the term "mini" means that the mini diker assembly 10 is dimensioned and configured for handling by an operator, such as a farmer, using conventional tools and minimal man hours.

Figure 3A:
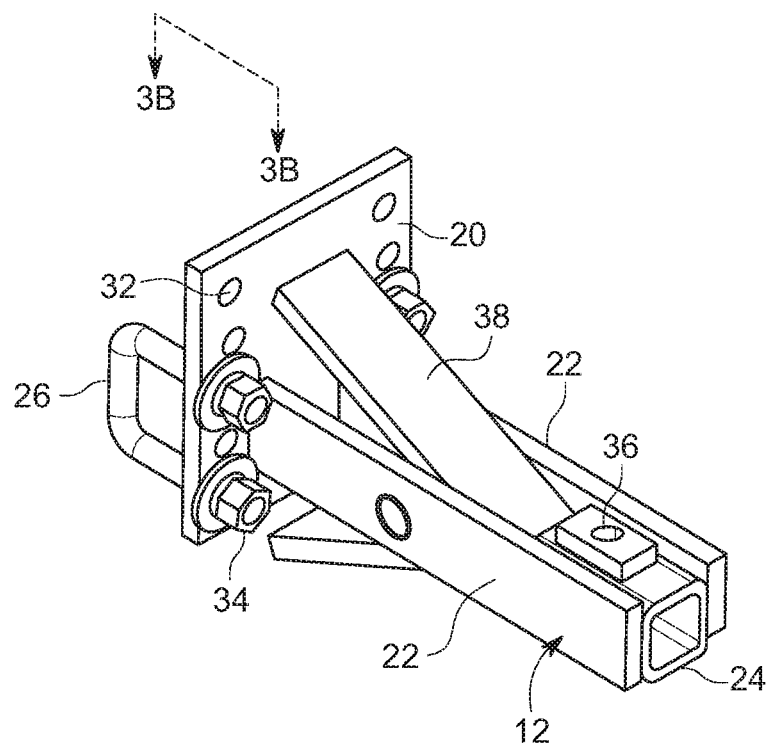
FIG. 3A is a perspective view of a mounting bracket assembly of the mini diker assembly.
Figure 3B:
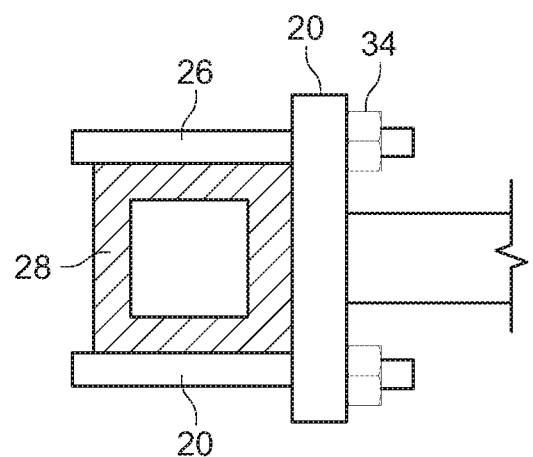
FIG. 3B is a schematic cross sectional drawing taken along section line 3B-3B of FIG. 3A illustrating the mounting bracket assembly of the mini diker assembly attached to square tubing on farming equipment.
Figure 8A:
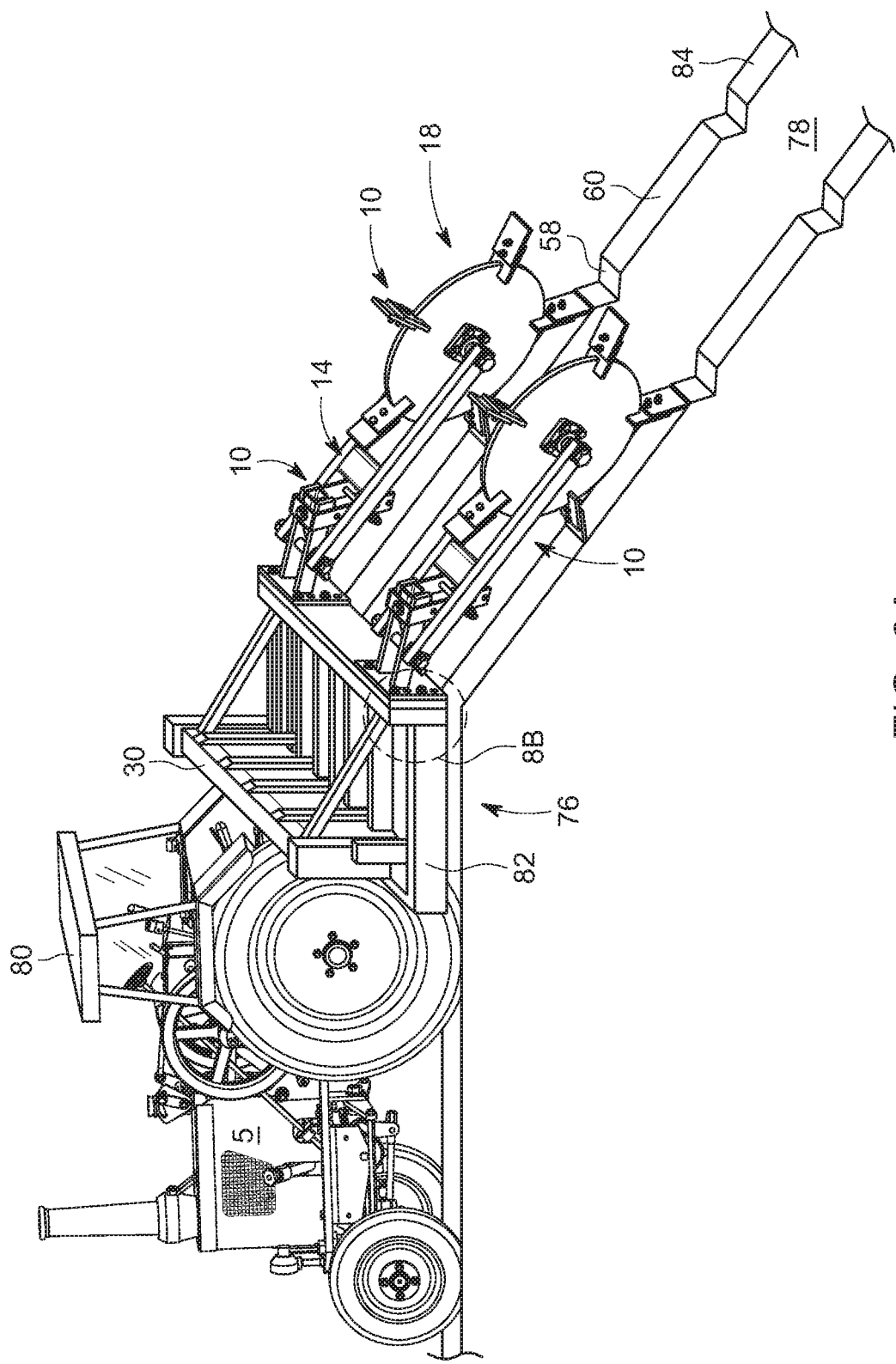
FIG. 8A is a schematic perspective view of a mini diker farm implement system in a field attached to farming equipment and a tractor and performing a diking method.

Referring to FIGS. 3A and 3B, the mounting bracket assembly 12 is shown separately. The mounting bracket assembly 12 includes a mounting plate 20, a pair of parallel spaced support plates 22 attached to a gusset attached to the mounting plate 20, and a lift arm support member 24 made of steel and welded together substantially as shown in FIG. 3A. The mounting bracket assembly 12 also includes threaded u-bolts 26 configured to engage square tubing 28 (FIG. 3B) on the farming equipment 30 (FIG. 8A). The mounting plate 20 includes openings 32 that allow different sizes of threaded u-bolts 26 to accommodate different sizes of square tubing 28 (FIG. 3B) using threaded nuts 34. The reversible and adjustable mounting bracket 12 (FIG. 3A) allows the mini diker assembly 10 (FIG. 1) to attach to multiple different-sized square tubing mounting points on various existing equipment ranging from 2×2" up to 6×6" steel square tube. The mounting bracket assembly 12 also provides the attachment and pivot point for the H-frame assembly 14 (FIG. 1) that connects at a thru hole pivot point 36 (FIG. 3A).

Figure 4:
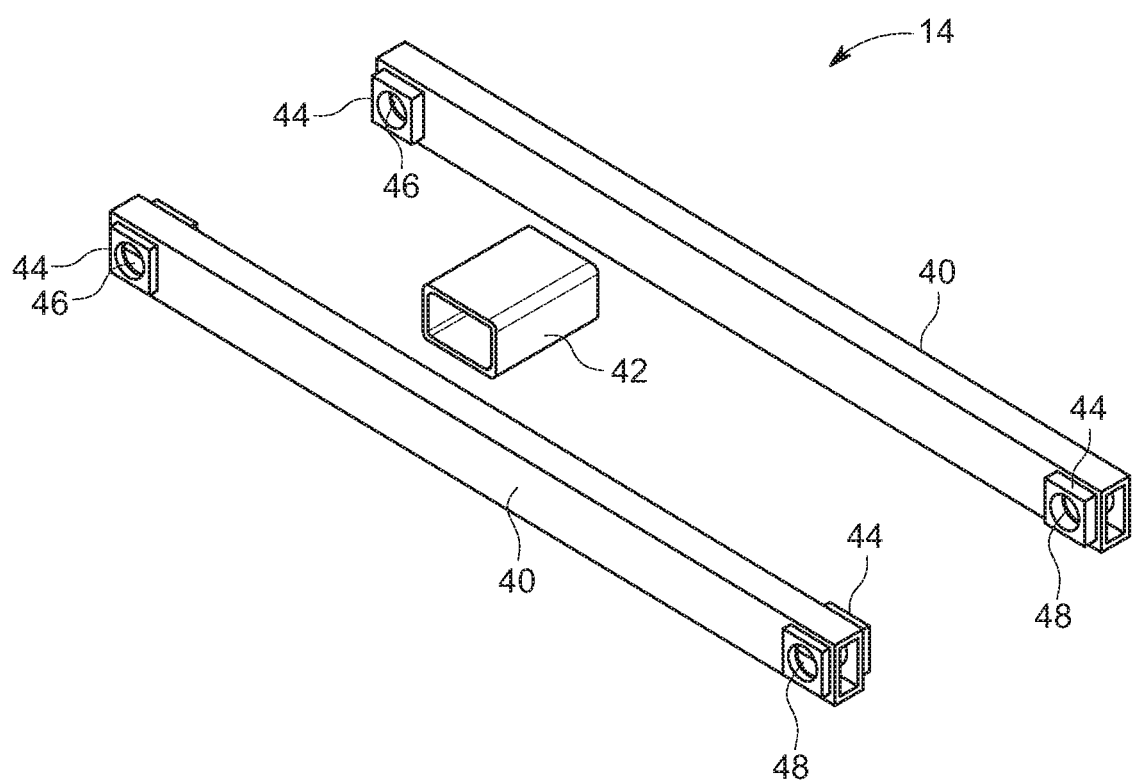
FIG. 4 is an exploded assembly drawing of an H frame assembly of the mini diker assembly.

Referring to FIG. 4, the H-frame assembly 14 is shown separately. The H-frame assembly 14 includes a pair of parallel support members 40 and a cross member 42 made of steel and welded together substantially as shown in FIG. 1A. The H-frame assembly 14 functions as the attachment and pivot point between the diker paddle wheel assembly 18 and the mounting bracket assembly 12. In addition, as will be further explained, the H-frame assembly 14 is configured to rest on top of an engagement point for the lift arm assembly 16. The cross member 42 functions as a mud cleaner for the diker paddle wheel assembly 18. The H-frame assembly 14 also includes pivot pin openings 46 configured to receive a pivot pin 50 (FIG. 2) for pivotably mounting the H-frame assembly 14 on the mounting bracket assembly 12, substantially as shown in FIG. 1. The H-frame assembly 14 also includes shaft openings 48 configured to a shaft 52 (FIG. 2) for rotatably mounting the diker paddle wheel assembly 18 on the H-frame assembly 14, substantially as shown in FIG. 1. In addition, welded shims 44 at wheel and pivot attachment points ensure proper spacing and clearances.

Figure 5:
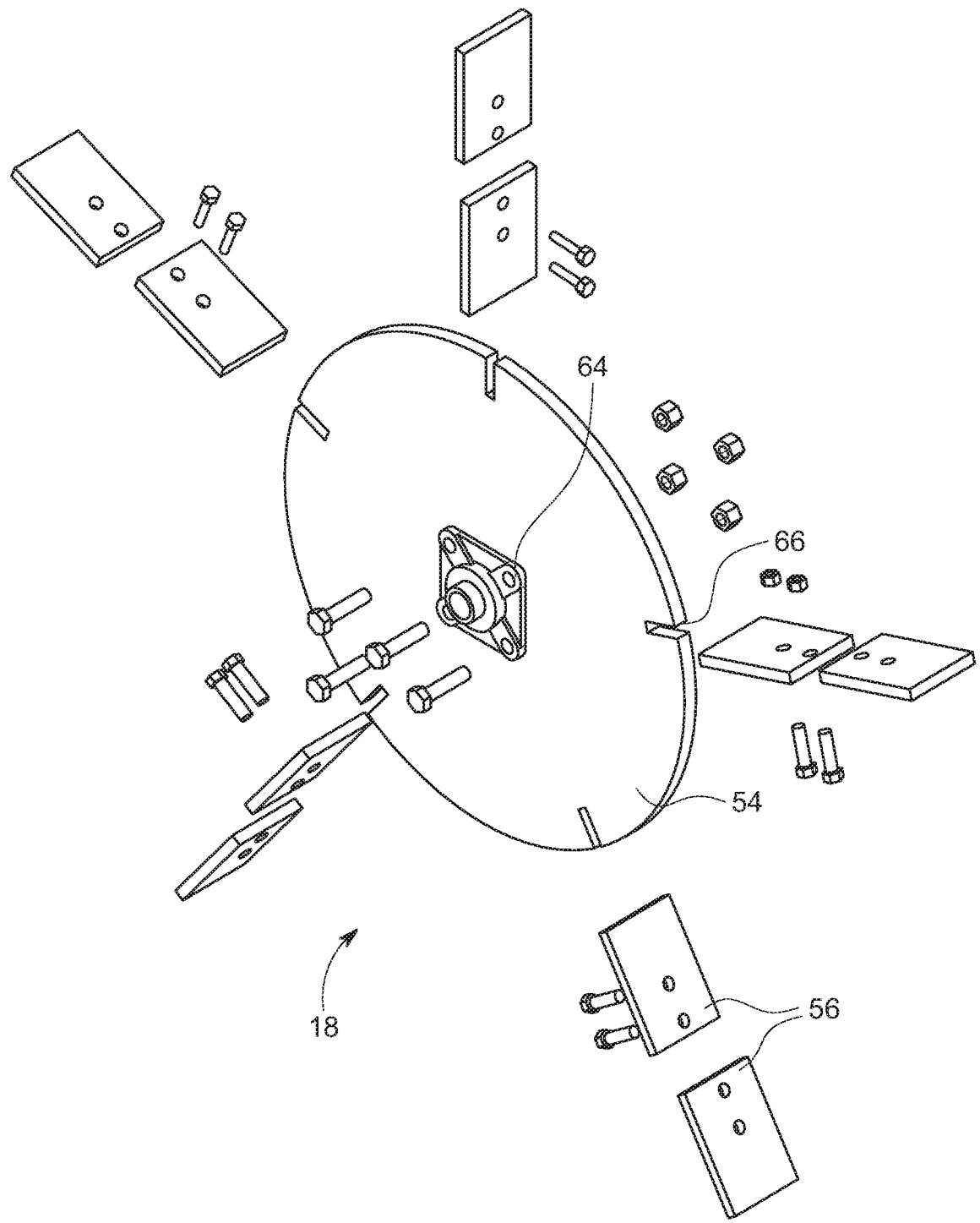
FIG. 5 is an exploded assembly drawing of a diker paddle wheel assembly of the mini diker assembly.
Figure 9:
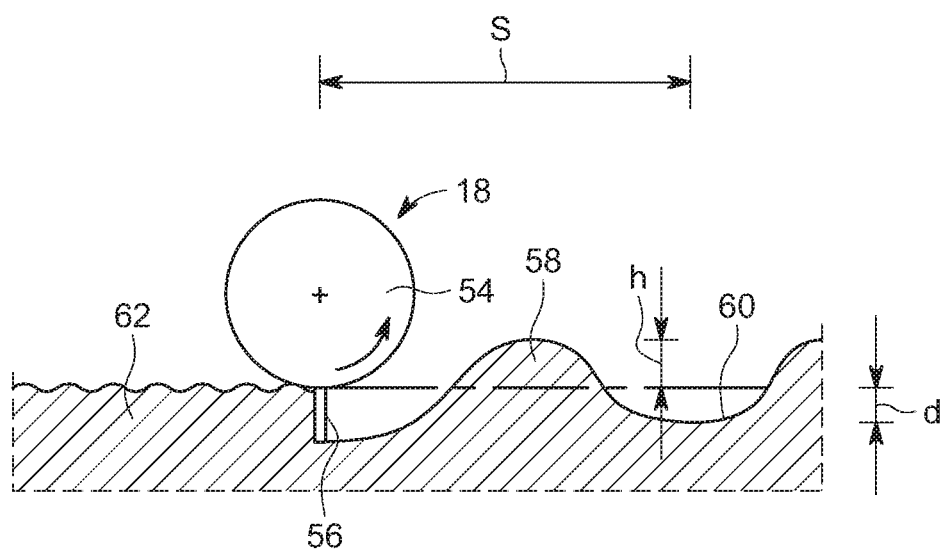
FIG. 9 is a schematic side elevation view illustrating operation of the diker wheel in a layer of soil forming dikes with a height h and reservoirs with a depth d.

Referring to FIG. 5, the diker paddle wheel assembly 18 is shown separately. The diker paddle wheel assembly 18 includes a diker paddle wheel 54 supported for rotation on the H-frame assembly 14 by bearings 64 configured to engage the diker wheel shaft 52 (FIG. 2). The diker paddle wheel assembly 18 also includes five paddles 56 adjustably mounted to slots 66 on the diker paddle wheel 54 using threaded fasteners substantially as shown in FIG. 5. The diameter of the diker paddle wheel 54, and the spacing, size and shape of the paddles 56 are selected to form dikes 58 (FIG. 9) and reservoirs 60 (FIG. 9) in a layer of soil 62 as the diker paddle wheel 54 rotates, substantially as shown in FIG. 9. In the illustrative embodiment the bearings 64 are 1" bore axle bearings and the paddles 56 are 3" wide steel paddles.

Figure 6:
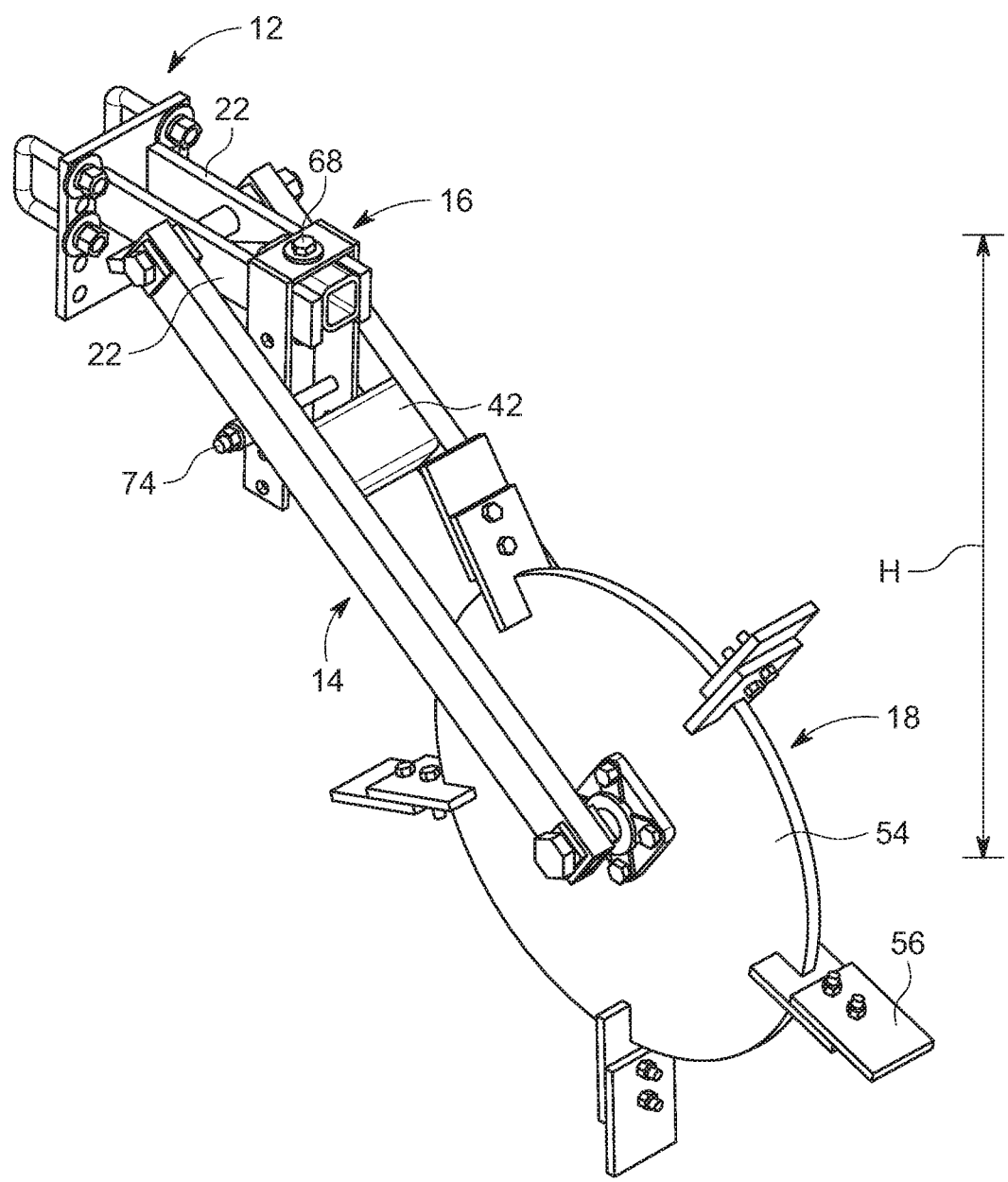
FIG. 6 is a perspective drawing of the mini diker assembly illustrating an operational position of the diker paddle wheel assembly having a height H above ground level.
Figure 7:
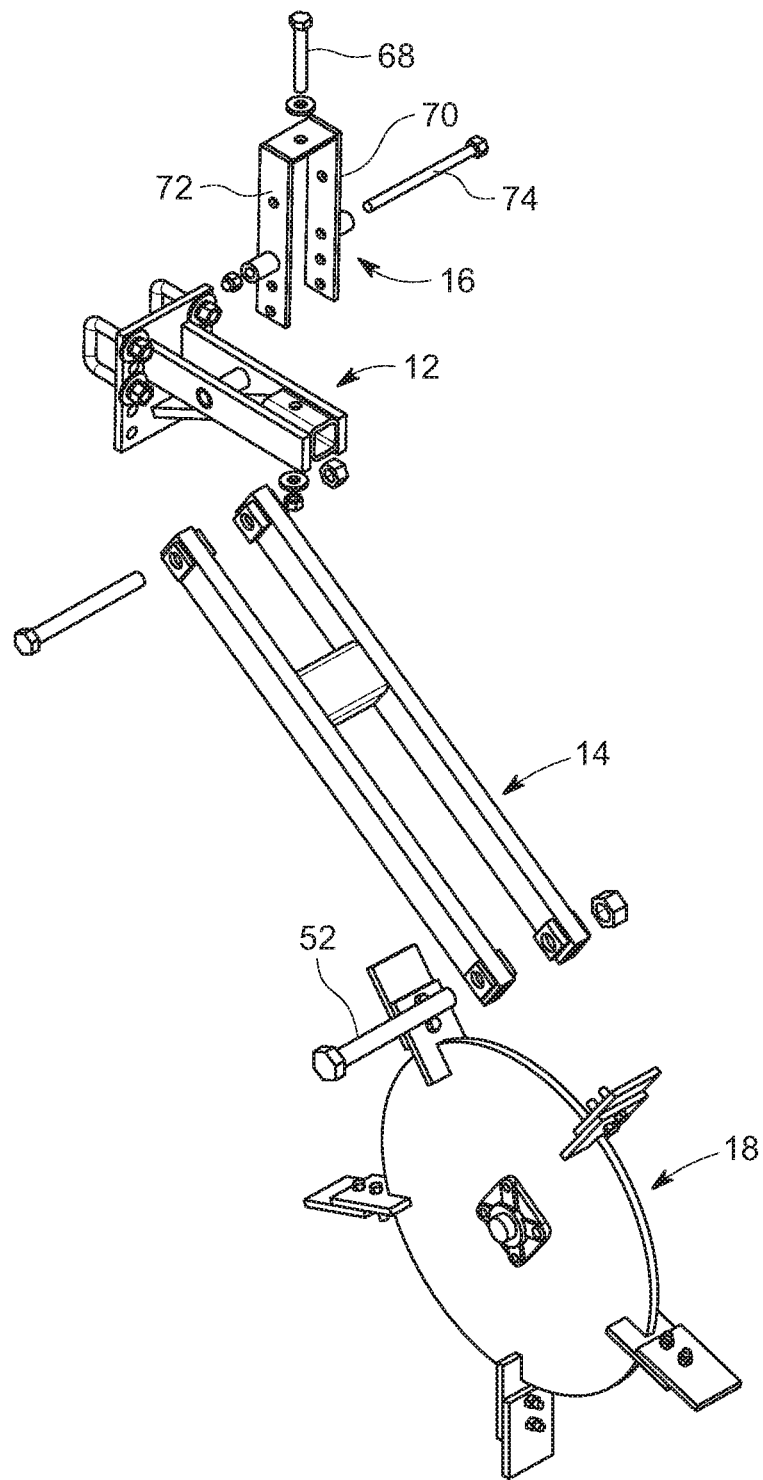
FIG. 7 is an exploded assembly drawing of the mini diker assembly in an operational position.

Referring to FIGS. 6 and 7, the adjustable lift arm assembly 16 includes a u-shaped member 70 having spaced openings 72 for receiving a depth adjustment pin 74. These elements are configured such that the depth adjustment pin 74 contacts the H-frame assembly 14 to adjust a vertical position of the diker paddle wheel 54 that can be quantified as the lift height H. In addition, in the operational position shown in FIG. 6, the u-shaped member 70 rests on the support plates 22 of the mounting bracket assembly 12 in a saddle position and attaches with one thru bolt 68. This configuration allows the operator to remove and reinstall the lift arm assembly 16 in the same location on the opposite side of the mounting bracket assembly 12 regardless of the orientation of the reversible mounting bracket assembly 12. The operator can also adjust each diker paddle wheel 54 engagement point and lift height H (FIG. 6) quickly by adjusting the depth adjustment pin 74 to other optional adjustment openings 72 on the lift arm assembly 16 allowing for further customization to various equipment lift and operating heights H. By independently adjusting the lift height H, the operator can customize the depth d of the reservoirs 60 (FIG. 9) and height h of the dikes 58 (FIG. 9). By way of example, the lift arm assembly 16 can be configured to provide a total of 6 different optional depth settings when attached to a mounting bracket assembly 12 made of 2×2" steel square tube.

Figure 8B:
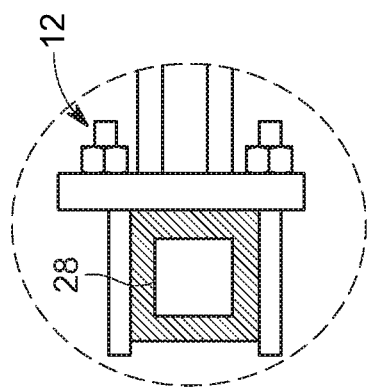
FIG. 8B is a schematic cross sectional view taken along section line 8B of FIG. 8A illustrating a mounting bracket assembly of the mini diker assembly attached to square tubing on the farming equipment.
Figure 8C:
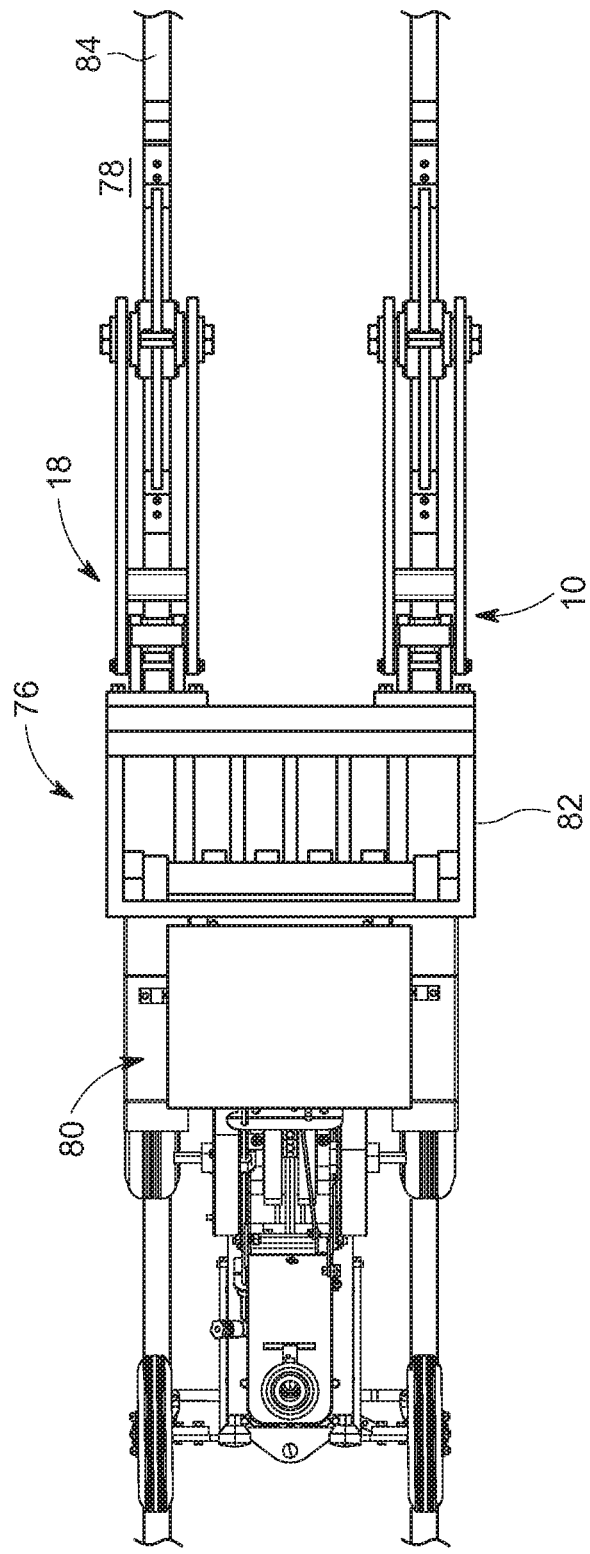
FIG. 8C is a schematic plan view taken along section line 8C-8C of FIG. 8A illustrating forming of dikes and reservoirs in the field during the diking method.

Referring to FIGS. 8A-8C, a mini diker farm implement system 76 is illustrated performing the presently claimed diking method in a field 78 having furrows 84. For illustrative purposes, the mini diker farm implement system 76 (FIG. 8A) includes two mini diker assemblies 10 (FIG. 8A) attached to farming equipment 82 (FIG. 8A) that includes square tubing 28 (FIG. 8B) attachment points for the mounting bracket assemblies 12. Alternately, any number of mini diker assemblies 10 (FIG. 8A) can be included in the mini diker farm implement system 76. Also by way of example, the farming equipment 82 can comprise a tool bar, a cultivator, a planter or a grain drill configured for movement through the field 78 by a tractor 80.

As shown in FIG. 8A, the diker paddle wheel assembly 18 forms the dikes 58 and the reservoirs 60 in the furrows 84 using only kinetic energy supplied by movement of the tractor 80. During irrigation or weather events, the reservoirs 60 fill with excess water run-off effectively reducing water and soil erosion in the layer of soil 62 (FIG. 9). The available captured water is later absorbed and helps to aid plant germination and development. Additionally, the pocketed or textured surface of the planted field 78 helps to offer effective wind protection to emerging plants from high winds and blowing soils. Control of the depth d (FIG. 9) of the reservoirs 60 and the height h (FIG. 9) of the dikes 58 can be achieved by adjusting the height H (FIG. 6) of the diker paddle wheel assembly 18 using the lift arm assembly 16, substantially as previously explained. The spacing S (FIG. 9) can be controlled by the configuration and size of the diker paddle wheel assembly 18 and the diker paddle wheels 54.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A diker farm implement system for diking a field comprising:
   a plurality of diker assemblies attachable to farming equipment configured for movement through the field by a tractor;

each diker assembly comprising a mounting bracket assembly configured for removal and height adjustable attachment to the farming equipment,
an H-frame assembly pivotably attached to the mounting bracket assembly, the H-frame assembly comprising parallel support members and a cross member,
a diker paddle wheel assembly comprising a paddle wheel supported for rotation by a shaft placed through the support members of the H-frame assembly, the diker paddle wheel assembly comprising a plurality of replaceable paddles configured to dig into a layer of soil in the field, and
a lift arm assembly removably attached to the mounting bracket assembly configured to adjust a position of the paddle wheel, the lift arm assembly comprising a member attached to the mounting bracket assembly having a plurality of spaced openings for receiving a depth adjustment pin configured to contact the support members of the H-frame assembly to adjust a lift height of the diker paddle wheel assembly to provide a plurality of different optional depth settings,
the diker paddle wheel configured to rotate with movement of the farming equipment by the tractor through the field so that the paddles form dikes and reservoirs in the layer of soil as the diker paddle wheel rotates, with a depth of the reservoirs and a height of the dikes controllable by adjustment of the lift height of the diker paddle wheel using the depth adjustment pin and the spaced openings of the lift arm assembly, and with each diker assembly configured for independent operation using only kinetic energy supplied by movement of the tractor.

2. The diker farm implement system of claim 1 wherein the mounting bracket assembly comprises a mounting plate, a pair of support plates, a lift arm support member and threaded u-bolts configured to engage different-sized square tubing on the farming equipment ranging from 2–2" to 6–6".

3. The diker farm implement system of claim 1 wherein the farming equipment comprises an element selected from the group consisting of tool bars, cultivators, planters and grain drills.

4. The diker farm implement system of claim 1 wherein the cross member of the H-frame assembly is configured as a mud cleaner for the diker paddle wheel assembly.

5. The diker farm implement system of claim 1 wherein the H-frame assembly includes pivot pin openings configured to receive a pivot pin for pivotably mounting the H-frame assembly on the mounting bracket assembly.

6. The diker farm implement system of claim 1 wherein the lift arm assembly comprises a u-shaped member having the spaced openings for receiving the depth adjustment pin that contacts the H-frame assembly.

7. The diker farm implement system of claim 1 wherein the farming equipment comprises a tool bar and the diker assemblies form a stand alone diking implement.

8. A diker farm implement system for diking a field comprising:
a plurality of diker assemblies attached to farming equipment configured for movement through the field by a tractor;
each diker assembly comprising a mounting bracket assembly configured for removal and height adjustable attachment to the farming equipment, the mounting bracket assembly comprising a mounting plate, a pair of support plates, a lift arm support member and threaded u-bolts configured to engage different sized square tubing on the farming equipment;
an H-frame assembly pivotably attached to the mounting bracket assembly comprising parallel support members and a cross member configured as a mud cleaner,
a diker paddle wheel assembly comprising a paddle wheel supported for rotation by a shaft placed through the support members of the H-frame assembly, the diker paddle wheel assembly comprising a plurality of replaceable paddles on the paddle wheel configured to dig into a layer of soil in the field, and
a lift arm assembly removably attached to the mounting bracket assembly configured to adjust a position of the paddle wheel, the lift arm assembly comprising a u-shaped member having spaced openings for receiving a depth adjustment pin that contacts the support members of the H-frame assembly to adjust a lift height of the diker paddle wheel assembly and to provide a plurality of different optional depth settings;
the diker paddle wheel configured to rotate with movement of the farming equipment by the tractor through the field so that the paddles form dikes and reservoirs in the layer of soil as the diker paddle wheel rotates, with a depth of the reservoirs and a height of the dikes controllable by adjustment of the lift height of the diker paddle wheel using the depth adjustment pin and the spaced openings of the lift arm assembly, and with each diker assembly configured for independent operation using only kinetic energy supplied by movement of the tractor.

9. The diker farm implement system of claim 8 wherein the farming equipment comprises an element selected from the group consisting of tool bars, cultivators, planters and grain drills.

10. The diker farm implement system of claim 8 wherein the H-frame assembly includes pivot pin openings configured to receive a pivot pin for pivotably mounting the H-frame assembly on the mounting bracket assembly.

11. The diker farm implement system of claim 8 wherein the farming equipment comprises a tool bar and the diker assemblies form a stand alone diking implement.

12. A diking method for diking a field comprising:
providing a diker farm implement system comprising a plurality of diker assemblies, each diker assembly comprising a mounting bracket assembly configured for removable and height adjustable attachment to farming equipment configured for movement through the field by a tractor, an H-frame assembly pivotably attached to the mounting bracket assembly comprising parallel support members and a cross member, a diker paddle wheel assembly supported for rotation by a shaft placed through the support members of the H-frame assembly and having a plurality of replaceable paddles configured to dig into a layer of soil, and a lift arm assembly configured to adjust a vertical position of the paddle wheel, the lift arm assembly comprising a member attached to the mounting bracket assembly having a plurality of spaced openings for receiving a depth adjustment pin that contacts the support members of the H-frame assembly to adjust a lift height of the diker paddle wheel assembly and to provide a plurality of different optional depth settings,
removably attaching the mounting bracket assembly to the farming equipment, adjusting the lift height of the paddle wheel using the depth adjustment pin and the spaced openings of the lift arm assembly, and moving the farming equipment through the field to rotate the diker paddle wheel and form dikes and reservoirs in the layer of soil, with a depth of the reservoirs and a height of the dikes controlled by the adjusting of the lift height of the diker paddle wheel using the depth adjustment pin and the spaced openings of the lift arm assembly and with each diker assembly operating independently using only kinetic energy supplied by movement of the tractor.

13. The method of claim 12 further comprising replacing the replaceable paddles to further control the height of the dikes and the depth of the reservoirs.

14. The method of claim 12 wherein the farming equipment comprises an element selected from the group consisting of tool bars, cultivators, planters and grain drills.

15. The method of claim 12 wherein the mounting bracket assembly comprises a mounting plate, a pair of support plates, a lift arm support member and threaded u-bolts configured to engage square tubing on the farming equipment.

\* \* \* \* \*